(12) United States Patent
Cayer

(10) Patent No.: US 9,568,140 B2
(45) Date of Patent: Feb. 14, 2017

(54) ADAPTER PLATE FOR CONNECTING TWO MONITORS TO AN ARM MOUNT

(71) Applicant: FIRST BASE INC, Woodbridge (CA)

(72) Inventor: Jean-Pierre Cayer, Woodbridge (CA)

(73) Assignee: FIRST BASE INC, Woodbridge, Ontario (CA)

( * ) Notice: Subject to any disclaimer, the term of this patent is extended or adjusted under 35 U.S.C. 154(b) by 96 days.

(21) Appl. No.: 14/490,872

(22) Filed: Sep. 19, 2014

(65) Prior Publication Data

US 2016/0084428 A1  Mar. 24, 2016

(51) Int. Cl.
| | |
|---|---|
| *F16M 11/00* | (2006.01) |
| *F16M 11/04* | (2006.01) |
| *A47B 81/06* | (2006.01) |
| *G06F 1/16* | (2006.01) |

(52) U.S. Cl.
CPC ............ *F16M 11/04* (2013.01); *A47B 81/062* (2013.01); *G06F 1/16* (2013.01); *F16M 11/00* (2013.01)

(58) Field of Classification Search
USPC .......................... 248/152, 146, 917, 918, 200
See application file for complete search history.

(56) References Cited

U.S. PATENT DOCUMENTS

| | | | | |
|---|---|---|---|---|
| 5,904,328 A | * | 5/1999 | Leveridge .............. | F16M 11/10 248/124.1 |
| 7,621,500 B2 | * | 11/2009 | Ishizaki .............. | F16C 11/0661 248/371 |
| 7,922,132 B2 | * | 4/2011 | Saez ...................... | F16M 11/04 248/124.1 |
| 7,997,550 B2 | * | 8/2011 | Kuhn ..................... | F16M 11/04 248/276.1 |
| 8,342,462 B2 | * | 1/2013 | Sapper ................... | F16M 11/10 248/124.1 |
| 9,247,861 B2 | * | 2/2016 | Kan ........................ | H04N 5/655 |
| 2007/0084978 A1 | * | 4/2007 | Martin ................ | F16M 11/105 248/176.1 |
| 2007/0205340 A1 | * | 9/2007 | Jung ...................... | F16M 11/24 248/125.9 |
| 2010/0128423 A1 | * | 5/2010 | Moscovitch .......... | F16M 11/04 361/679.01 |

OTHER PUBLICATIONS

Doublesight Displays DS-224STA Dual Monitor Flex Stand, Staples.com, http://www.staples.com/Doublesight-Displays-DS-224STA-Dual-Monitor-Flex-Stand-Up-To-24-inch/product_IM1BA6220, 2 pages, Document is undated but the document was printed from the pertinent website on Sep. 9, 2014.

* cited by examiner

*Primary Examiner* — Alfred J Wujciak
(74) *Attorney, Agent, or Firm* — Sand & Sebolt

(57) ABSTRACT

An adapter plate permits an arm mount with a single abutment plate to support two monitors. The adapter plate includes a first hole, a second hole, and a third hole. The holes may be part of a first set of holes, a second set of holes, and a third set of holes, respectively. Each of the sets of holes is preferably configured in a symmetric pattern compliant with VESA standard configurations for flat panel monitor mounts. One set of holes aligns with the abutment plate on the arm mount and the other two sets of holes align with the two monitors respectively to receive support members, such as bolts, therethrough to couple the two monitors to the single abutment plate on the arm mount.

17 Claims, 5 Drawing Sheets

ADAPTER PLATE FOR CONNECTING TWO MONITORS TO AN ARM MOUNT

BACKGROUND

Technical Field

The present disclosure relates generally to the field of mounting devices for flat panel monitors. More particularly, the present invention relates to an adapter plate for connecting two monitors to an arm mount. Specifically, the present invention relates to an adapter plate forming three sets of holes therein, one set of holes aligned to an arm mount, one set of holes aligned with a first monitor, and one set of holes aligned with a second monitor.

Background Information

With the advent of flat panel monitor technology, a wide variety of mounting device began to develop in order to mount monitors to various locations. One particular mount is known as an arm mount. An arm mount is attached to a solid structure, such as a wall, at one end and is coupled to a monitor at an opposite end. The arm mount includes an abutment plate defining holes arranged in an industry standard VESA alignment. The holes in the abutment plate align with a set of VESA arranged nuts in a monitor. Bolts extend through the holes in the abutment plate threadedly into the set of nuts to connect the flat panel monitor to the arm mount. Additionally, some arm mounts may be extendable or collapsible about a pivot joint.

Some computer processors are programmed to provide a visual output or display across two monitors. This is often colloquially known as a "dual screen mode." Dual screen modes are advantageous inasmuch as they allow the display of more information to the operator at a single time. Further, many operators express that they prefer utilizing two screens over the use of one screen.

SUMMARY

Issues continue to exist with arm mounts that are designed to hold a single monitor but when an operator owns and desires to use two monitors in dual screen mode. The present invention addresses these and other issues.

In one aspect, an embodiment of the invention may provide an adapter plate for holding two or more monitors to an arm mount comprising: a plate member including a first edge spaced apart from a second edge; and the plate defining three holes, each hole adapted to receive a bolt therethrough while the plate is abutting one of a monitor and an arm mount.

In another aspect, an embodiment of the invention may provide a plate member including a first edge spaced apart from a second edge; and the plate defining three holes, each hole adapted to receive a bolt therethrough while the plate is abutting one of a monitor and an arm mount; in combination with an arm mount for mounting a monitor, the combination comprising: a first set of holes formed in the plate, wherein one of the three holes is part of the first set of holes; an abutment plate on the arm mount defining a plurality holes for receiving a bolt therethrough, the plurality of holes in the abutment plate arranged complementary to the first set of holes formed in the plate.

In another aspect, an embodiment of the invention may provide a plate member defining three holes, each hole adapted to receive a bolt therethrough while the plate is abutting one of a monitor and an arm mount; in combination with two monitors, the combination comprising: a first set of nuts on the first monitor; a second set of nuts on the second monitor; the plate defining a first set of slots and a second set of slots, the first and second set of slots arranged complementary to the first and second set of nuts allowing mounting bolts to extend through the slots threadedly into the nuts when the two monitors abut the plate.

In another aspect, an embodiment of the invention may provide a method comprising the steps of coupling a first monitor to an arm mount via an adapter plate; and coupling a second monitor said arm mount via said adapter plate. In another aspect, an embodiment of the invention may provide a method comprising the steps of: attaching an adapter plate to a single arm monitor mount; and attaching two or more monitors to the adapter plate, wherein the two monitors do not displace relative to each other.

In another aspect, an embodiment may provide an adapter plate coupling an abutment plate on an arm mount to at least two monitors. The adapter plate includes a first hole, a second hole, and a third hole. The holes may be part of a first set of holes, a second set of holes, and a third set of holes, respectively. Each of the sets of holes is preferably configured in a symmetric pattern compliant with VESA standard configurations for flat panel monitor mounts. One set of holes aligns with the abutment plate on the arm mount and the other two sets of holes align with the two monitors respectively to receive support members, such as bolts, therethrough to couple the two monitors to the single abutment plate on the arm mount.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims. The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
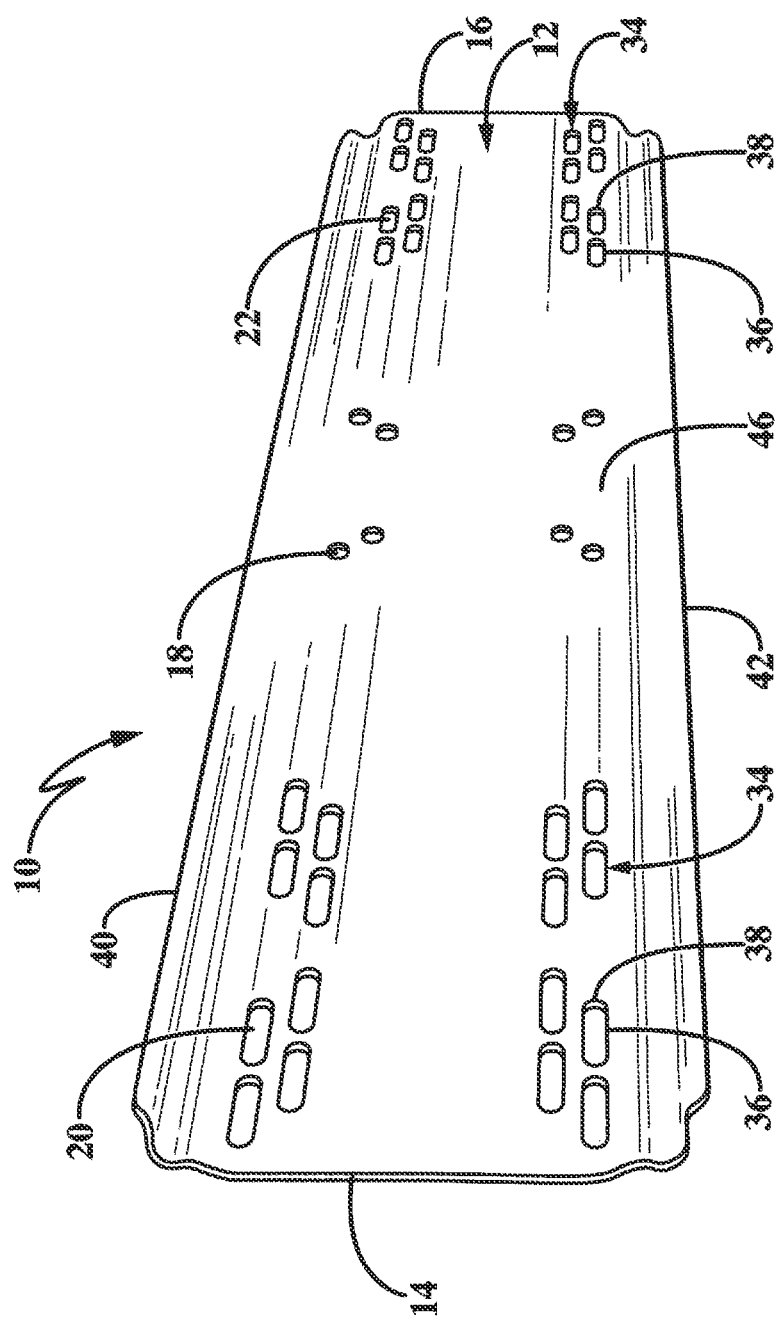
FIG. 1 is a perspective view of an adapter plate of the present invention.

The new adapter plate for holding two or more monitors to an arm mount of the present disclosure is depicted throughout FIGS. 1-5 and is shown generally as 10. Adapter plate 10 includes a planar plate member 12 including a generally vertical first edge 14 spaced apart from a generally vertical second edge 16. Plate member 12 defines three holes; a first hole 18, a second hole 20, and a third hole 22. Each of the three holes 18, 20, 22 is adapted to receive a bolt therethrough while the adapter plate 10 is abutting one of a monitor and an arm mount. Adapter plate 10 couples two or more monitors to an arm having a single abutment plate.

Figure 2:
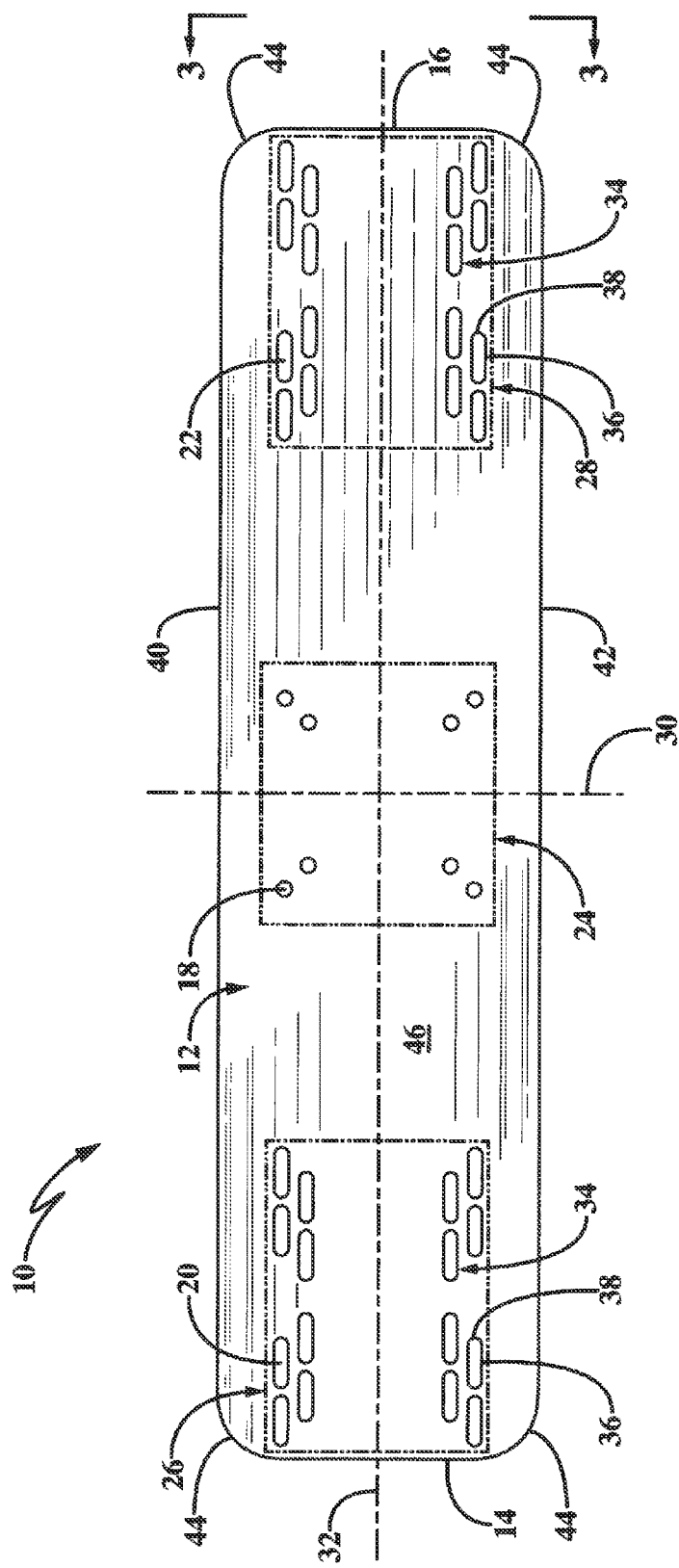
FIG. 2 is a front view of the adapter plate.

As depicted in FIG. 2, a vertical symmetry line 30 is associated with the adapter plate 10. A longitudinal symmetry line 32 is associated with adapter plate 10 intersecting vertical symmetry line 30 perpendicularly. In one particular embodiment, plate member 12 is symmetrical about each of the vertical symmetry line 30 and the longitudinal symmetry line 32.

Plate member 12 defines a first set of holes 24. First hole 18 is included within the first set of holes 24. First set of holes 24 is formed symmetrically about vertical symmetry line 30. First set of holes 24 is formed symmetrically about longitudinal symmetry line 32. First set of holes 24 is formed in a pattern. In one particular embodiment, the pattern is a general X-like configuration which is compliant with a VESA mounting configuration for a conventional flat panel monitor. The first set of holes 24 includes four inner holes defined in the plate member that are preferably 75 millimeters square and four outer holes that are 100 millimeters square as one having ordinary skill in the art would understand. First set of holes 24 is indicated within the dashed line box in FIG. 2.

Plate member 12 defines a second set of holes 26. The second hole 20 is included within the second set of holes 26. Second set of holes 26 is positioned offset to one side of vertical symmetry line 30. Second set of holes 26 is positioned adjacent first edge 14. Second set of holes 26 is symmetric about longitudinal symmetry line 32 forming a general X-like pattern compliant with a VESA configuration for a conventional flat panel monitor. The second set of holes 26 is indicated within the dashed line box in FIG. 2.

A third set of holes defined in plate member 12 is offset to a side of vertical symmetry line 30 opposite that of second set of holes 26. Third set of holes 28 includes third hole 22 as part of the third set 28. Third set of holes 28 is symmetric about longitudinal symmetry line 32. Third set of holes 28 defines a general X-like pattern compliant with VESA configurations to receive bolts therethrough for mounting a flat panel monitor. The third set of holes 28 is indicated within the dashed line box in FIG. 2.

The second set of holes 26 and the third set of holes 28 are symmetric relative to each other about a symmetry line. In one particular embodiment, second set of holes 26 and third set of holes 28 are symmetric relative to each other about vertical symmetry line 30. Further, in one particular embodiment, the first set of holes 24, the second set of holes 26, and the third set of holes 28 are all symmetric about the longitudinal symmetry line 32.

The vertical symmetry line 30 and the longitudinal symmetry line 32 associated with adapter plate 10 divide plate member 12 into four quadrants. Each quadrant of plate member 12 defines a number of holes. In one particular embodiment, the plate member 12 defines an equal number of holes in each quadrant.

The second set of holes 26 and the third set of holes 28 may include a plurality of slots 34. The slots 34 are defined by a linear edge 36 connected to an arcuate edge 38. The slots 34 are generally the shape of a rounded rectangle allowing for longitudinal adjustability of two monitors when coupled to the adapter plate 10. Slot 34 generally has a length longer in a longitudinal direction than its height in the vertical direction.

With continued reference to FIG. 2, plate member 12 includes a top edge 40 spaced apart and generally parallel with bottom edge 42. Top and bottom edges 40, 42 extend from adjacent first edge 14 longitudinally towards second edge 16. In one particular embodiment, plate member 12 includes rounded corners 44 that connect top edge 40 to first and second edges 14, 16. As well as rounded corners 44 connecting bottom edge 42 to first and second edges 14,16. Plate member 12 includes a forward facing front first surface 46 spaced apart from a rearwardly facing rear second surface 48. Each of the holes within the first set of holes 24, second set of holes 26, and third set of holes 28 extend completely through plate member 12 from first surface 46 to second surface 48.

Figure 3:
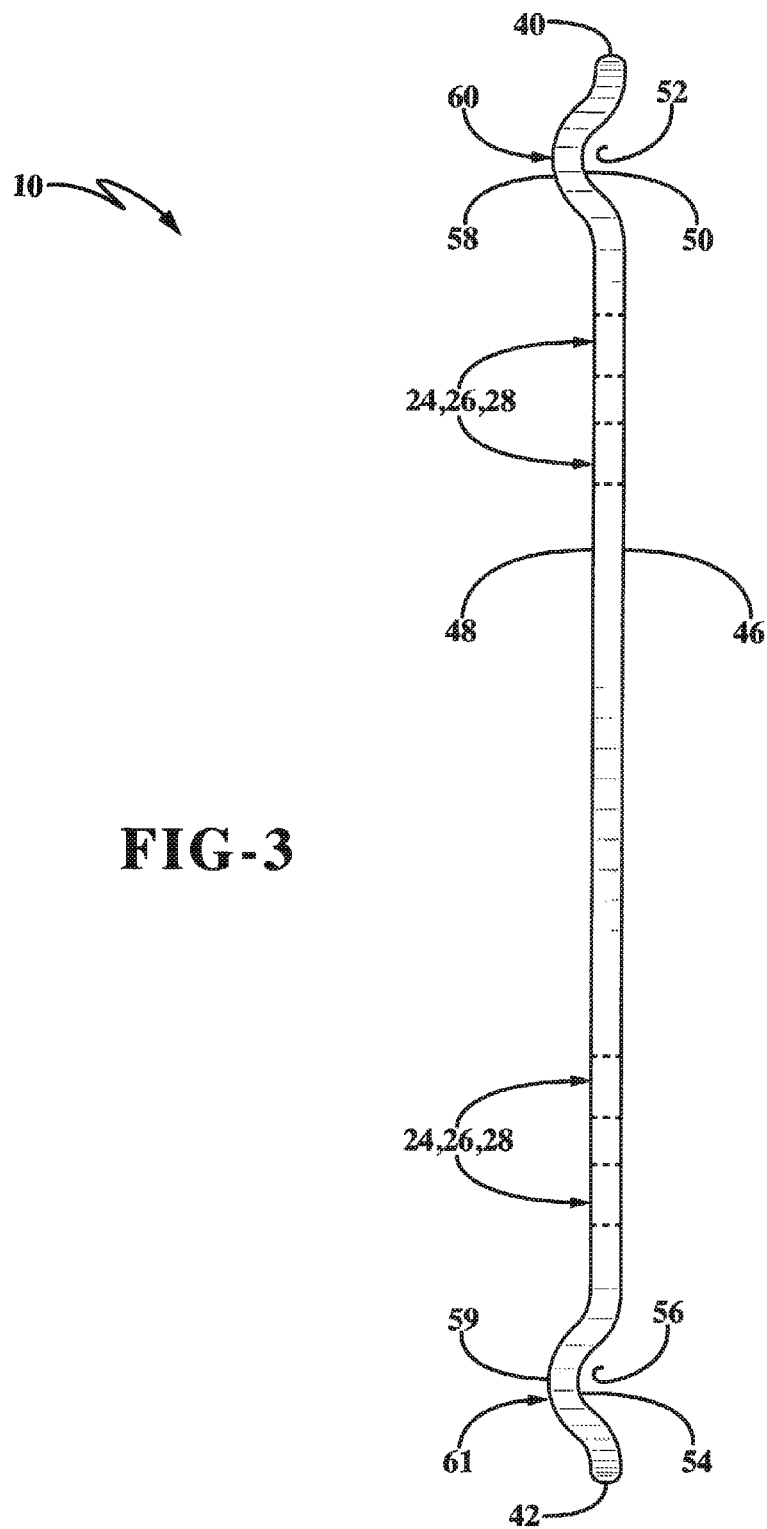
FIG. 3 is a side view of the adapter plate taken along line 3-3 in FIG. 2.

As depicted in FIG. 3, a concave surface 50 defines a channel 52 adjacent top edge 40 along the front first surface 46 of plate member 12. The concave surface 50 includes a first end adjacent first edge 14 and a second end adjacent second edge 16 such that the channel 52 extends longitudinally across plate member 12. In one particular embodiment, each of the first, second, and third set of holes 24, 26, 28 are offset to one side of channel 52. As depicted in FIG. 3, each of the first set of holes 24, 26, 28 are offset below channel 52. With continued reference to FIG. 3, a second concave surface 54 extends from adjacent first edge 14 to second edge 16 longitudinally across plate member 12 defining a second channel 56 adjacent plated bottom edge 42. In one particular embodiment, each of the first, second, and third set of holes 24, 26, 28 are positioned between the two channels 52, 56. Both channels 52, 56 are formed in the forward facing front surface 46 of plate member 12.

With continued reference to FIG. 3, a convex surface 58 is opposite from concave surface 50. Convex surface 58 defines a protrusion 60 extending longitudinally across the rear surface 48 of plate member 12 from first edge 14 to second edge 16. Protrusion 60 is configured to face rearwardly or towards a mounting substrate such as a wall when adapter plate is in use. Convex surface 58 includes a first end adjacent the first edge 14 and a second end adjacent second edge 16 such that protrusion 60 extends longitudinally across plate member 12.

A convex surface 59 is opposite from concave surface 54. Convex surface 59 defines a protrusion 61 extending longitudinally across the rear surface 48 of plate member 12 from first edge 14 to second edge 16. Protrusion 61 is configured to face rearwardly or towards a mounting substrate such as a wall when adapter plate is in use. Convex surface 59 includes a first end adjacent the first edge 14 and a second end adjacent the second edge 16 such that protrusion 61 extends longitudinally across plate member 12. Protrusion 61 is adjacent bottom edge 42 on plate member 12. Protrusion 61 is generally parallel with protrusion 60. In one particular embodiment the first set of holes 24, the second set of holes 26, and the third set of holes 28 are defined in plate member 12 positioned between the longitudinally extending protrusions 60, 61.

Figure 4:
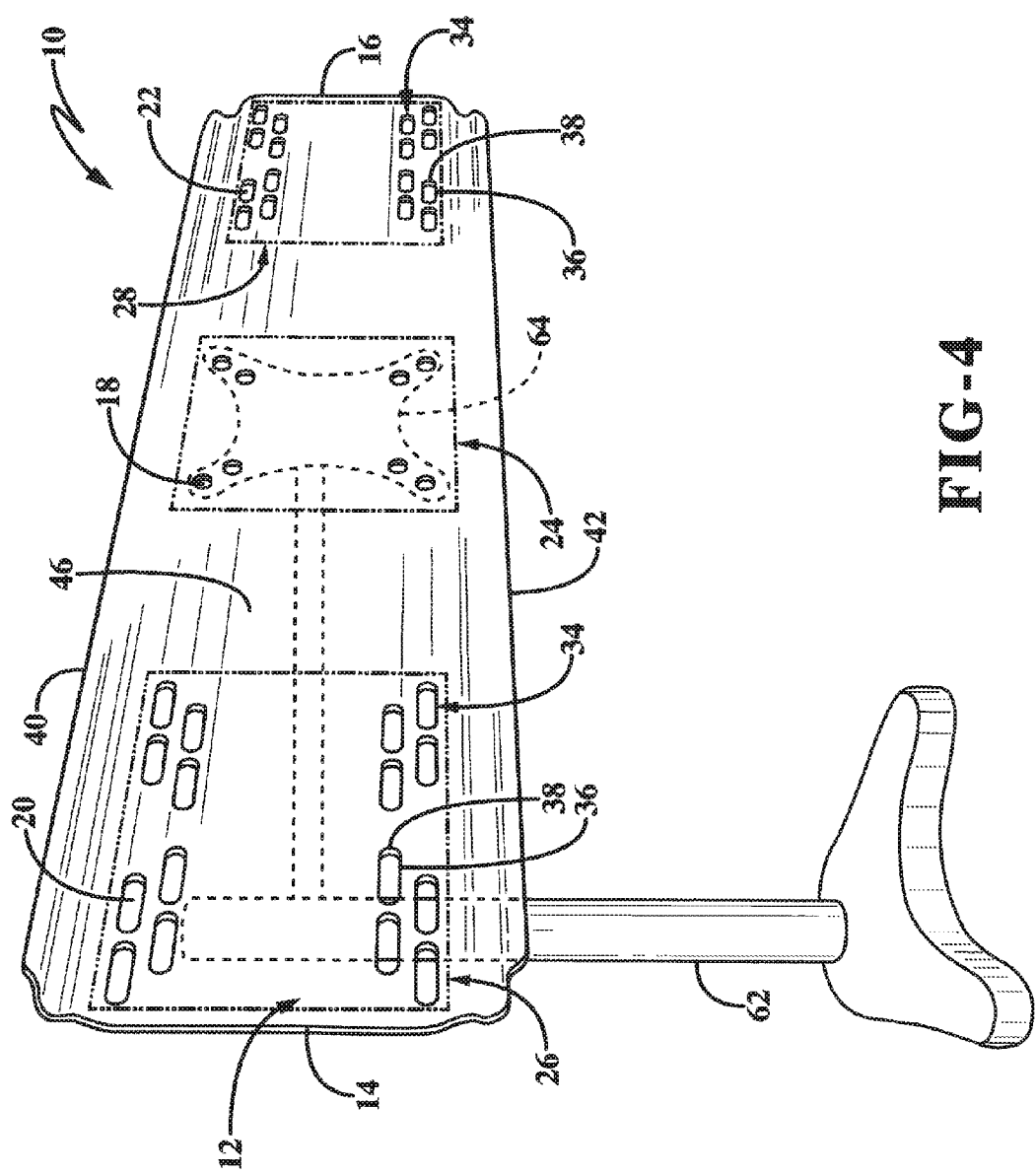
FIG. 4 is an operational perspective view of the adapter plate connected to a single arm mount.

As depicted in FIG. 4, an arm mount 62 is depicted as coupled to the rear surface 48 aligned with first set of holes 24. Arm mount 62 includes an abutment plate 64 configured to abut the rear surface 48 of plate member 12. Abutment plate 64 defines a plurality of holes therethrough arranged in a manner complimentary to first set of holes 24. The holes in abutment plate 64 allow a fastener, such as a bolt, screw, or other securing member to be inserted through first set of holes 24 and through the holes on abutment plate 64 to connect adapter plate 10 to arm mount 62. While the arm mount 62 is shown as a pedestal style arm mount, clearly, it is to be understood that arm mount 62 can be mounted to a wall surface.

Figure 5:
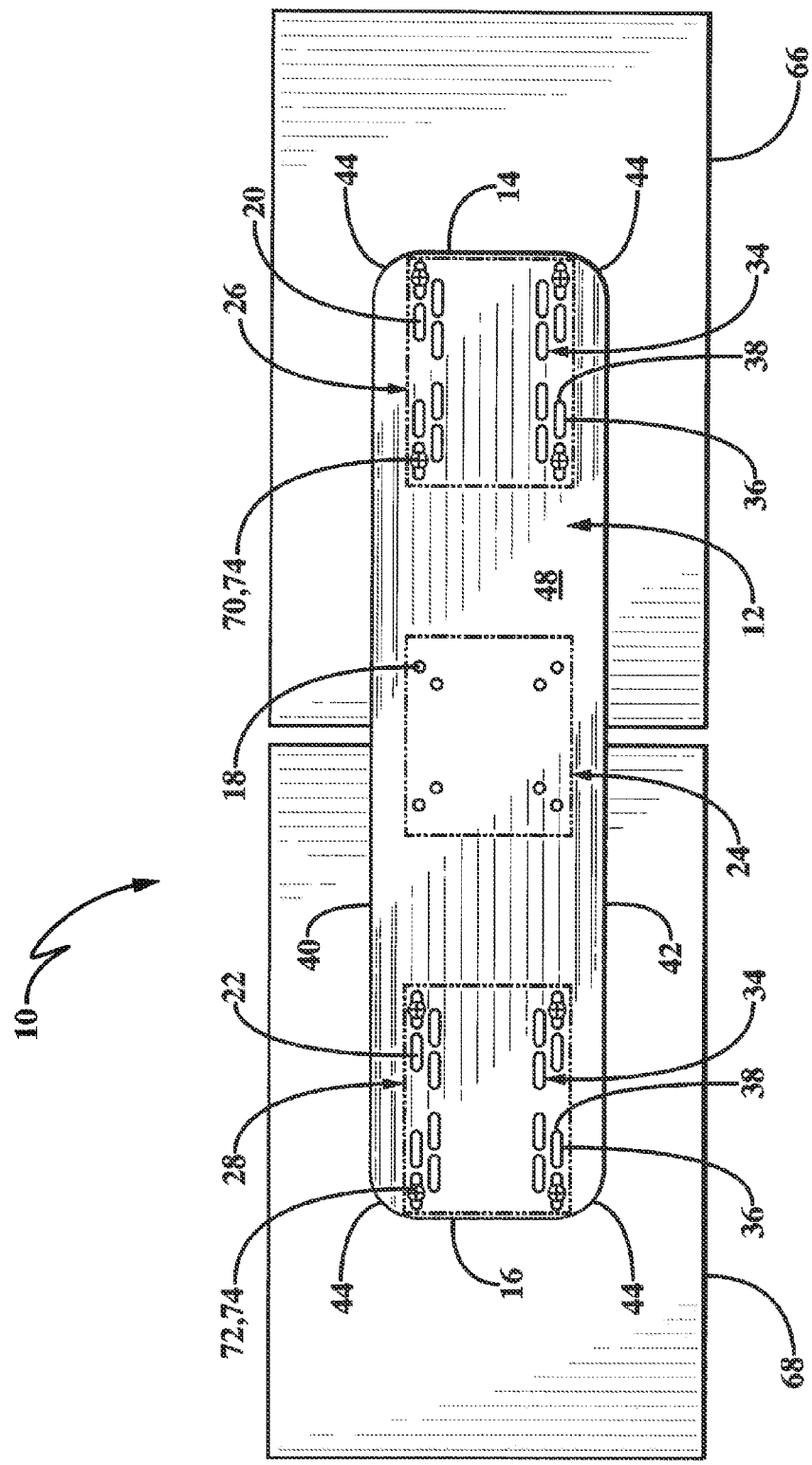
FIG. 5 is a rear view of the adapter plate with two monitors attached thereto.

As depicted in FIG. 5, a rear view of the adapter plate 10 is shown coupled with a first monitor 66 and a second monitor 68. A first set of nuts 70 is in first monitor 66. A second set of nuts 72 are in second monitor 68. Each of the first and second sets of nuts 70, 72 are arranged complimentary to first and second sets of holes 26, 28 allowing mounting bolts 74 to extend through holes or slots in the first and second sets of holes 26, 28 threadedly into the nuts 70, 72 when the two monitors 66,68 abut device 10.

In accordance with an aspect of the present invention, an adapter plate 10 is configured to hold two monitors, 66, 68 abutted to the front surface 46. Adapter plate 10 abuts an arm mount 62 at its rear surface 48. There are three sets of holes 24, 26, 28 defined in the adapter plate 10 that allow bolts 74 to extend therethrough coupling two monitors to a single arc mount. One exemplary, non-limiting advantage of the present invention is that adapter plate 10 allows a user to mount two monitors to mount a single arm mount that is ordinarily only configured to attach to a single monitor. The adapter plate 10 provides a user more flexibility in their monitor viewing experience.

In accordance with another aspect of the invention, adapter plate 10 retrofits a single arm mount 62 to hold two monitors 66, 68 in an aligned manner. Adapter plate 10 is a generally rigid member that causes a physical link between two monitors 66, 68 such that the two monitors do not move relative to each other if the arm 62 moves. This is advantageous when using touch screen monitors in dual screen mode. Further, this overcomes some disadvantages with current prior art arm mounts that may cause a touch screen monitor to shift its relative position angle when touched by an operator.

In operation, an operator preferably has a single arm mount securely connected to a substrate such as a wall or a post. The first set of holes 24 are aligned with the abutment plate 64 on arm mount 62. Adapter device 10 is coupled to abutment plate 64 at the first set of holes 24. Once the adapter plate 10 has been coupled to arm mount 62, operator couples a first monitor 66 to adapter plate 10 by aligning the first set of nuts 70 with the first set of holes 26. Bolt 74 is extended through the first set of holes 26 and threadedly received into the nuts in the first monitor 66. A second monitor 68 is coupled to device 10 by aligning the second set of nuts 72 with the third set of holes 28. Bolts 74 are threadedly received into nuts through the first set of holes 28. When attached to device 10, the monitors 66, 68 are arranged side-by-side. Additionally, the two monitors 66, 68 do not displace relative to each other when attached to adapter 10.

While adapter plate 10 is depicted as having a top edge 40 of the plate member 12 aligned with a longitudinal axis 12 effecting a side-by-side arrangement of the first and second monitors 66, 68, clearly is contemplated that adapter plate 10 may be vertically oriented to mount monitors in a top-to-bottom or stacked configuration.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

What is claimed:

1. In combination, an adapter plate holding first and second monitors to an arm mount, the combination comprising:
   a first edge spaced apart from a second edge on the adapter plate;
   the adapter plate defining a first hole, a second hole, and a third hole, wherein each hole is adapted to receive a bolt therethrough while the plate is abutting the first monitor, the second monitor, and an abutment plate on the arm mount;
   a first set of nuts on the first monitor;
   a second set of nuts on the second monitor;
   the adapter plate defining a first set of slots, wherein the first hole is part of the first set of slots;
   the plate defining a second set of slots, wherein the second hole is part of the second set of slots; and
   wherein the first and second set of slots are arranged complementary to the first and second set of nuts allowing mounting bolts to extend through the slots threadedly into the nuts when the two monitors abut the adapter plate.

2. The adapter plate combination of claim 1, further comprising:
   a vertical symmetry line associated with the adapter plate; and
   wherein the second set of holes and the third set of holes are symmetric with each other about relative to the symmetry line.

3. The adapter plate combination of claim 1, further comprising:
   a longitudinal symmetry line associated with the adapter plate; and
   wherein the first, second, and third set of holes are symmetric about relative to the symmetry line.

4. The adapter plate combination of claim 3, further comprising:
   a vertical symmetry line associated with the plate;
   wherein the plate defining a first set of slots offset are offset entirely to a first side of the plate relative to the vertical symmetry line, wherein one of the three holes is included in the first set of slots.

5. The adapter plate combination of claim 1, further comprising:
   a vertical symmetry line associated with the adapter plate;
   a longitudinal symmetry line associated with the adapter plate; and
   wherein the first set of holes are arranged symmetrically about relative to both the vertical symmetry line and the longitudinal symmetry line.

6. The adapter plate combination of claim 5, further comprising:
   the plate defining wherein the second set of slots offset are offset entirely to a second side of the plate relative to the vertical symmetry line, wherein one set of the three sets of holes is included in the second set of slots.

7. The adapter plate combination of claim 1, further comprising:
   the plate defining a first set of slots, wherein one of the three holes is part of the first set of slots; and
   a linear edge in the adapter plate connected to an arcuate edge in the adapter plate defining a slotted opening through the plate, wherein the slotted opening is part of one slot of the first set of slots;
   wherein the first set of slots permits slight longitudinal adjustability.

8. The adapter plate combination of claim 7, further comprising:
a first end of the concave surface adjacent the first edge and a second end of the concave surface adjacent the second edge such that the channel extends across the adapter plate.

9. The adapter plate combination of claim 1, further comprising:
a top edge on the adapter plate extending between the first and second edges; and
a concave surface adjacent the top edge defining a channel in a surface of the adapter plate.

10. The adapter plate combination of claim 9, further comprising:
a forward facing front surface on the adapter plate, wherein the channel is defined in the front surface.

11. The adapter plate combination of claim 1, further comprising:
a bottom edge on the adapter plate extending longitudinally between the first and second edges;
a longitudinally extending concave surface adjacent the bottom edge defining a bottom channel in a front surface of the adapter plate; and
a longitudinally extending convex surface opposite the concave surface defining a longitudinal protrusion on a rear surface of the adapter plate.

12. The adapter plate combination of claim 1, further comprising:
a first concave surface adjacent a top edge of the adapter plate defining a channel;
a second concave surface adjacent a bottom edge of the adapter plate defining a channel; and
wherein the first, second, and third holes are positioned between the first and second concave surfaces.

13. The adapter plate combination of claim 1, further comprising:
a first protrusion on a back surface of the adapter plate member;
a second protrusion on the back surface spaced apart from the first protrusion, each of the first and second protrusions adapted to face a substrate when adaptably mounting two monitors to an arm mount with a single abutment plate.

14. The adapter plate combination of claim 1, in combination with an arm mount for mounting a monitor, the combination comprising:
a first set of holes formed in the plate member, wherein one of the three holes is part of the first set of holes; and
wherein the abutment plate on the arm mount defining defines a plurality of holes for receiving a bolt therethrough, the plurality of holes in the abutment plate arranged complementary to the first set of holes formed in the plate.

15. In combination, an adapter plate holding first and second monitors to an arm mount, the combination comprising:
a set of holes formed in the adapter plate, wherein a hole is one hole in the set of holes;
a first set of slots formed in the adapter plate wherein a first slot is one slot in the first set of slots;
a second set of slots formed in the adapter plate, wherein a second slot is one slot in the second set of slots;
an abutment plate on the arm mount defining a plurality of holes for receiving a bolt therethrough, the plurality of holes in the abutment plate arranged complementary to the set of holes formed in the adapter plate;
a first set of nuts on the first monitor;
a second set of nuts on the second monitor; and
wherein the first and second sets of slots are arranged complementary to the first and second set of nuts respectively to allow fasteners to extend through the first and second set of slots into the nuts when the two monitors abut the adapter plate that contacts the abutment plate.

16. The combination of claim 15, further comprising:
a forward facing first surface on the adapter plate member;
a rearward facing second surface on the adapter plate member;
the two monitors positioned forwardly from the first surface; and
the arm mount positioned rearwardly from the second surface.

17. The combination of claim 15, further comprising:
a slot formed in the adapter plate member receiving a fastener therethrough;
wherein the slot permits slight adjustability of the first and second monitors.

* * * * *